Aug. 11, 1942.  W. A. CARMICHAEL  2,292,612
INSIDE HANDLE ESCUTCHEON
Filed July 3, 1940
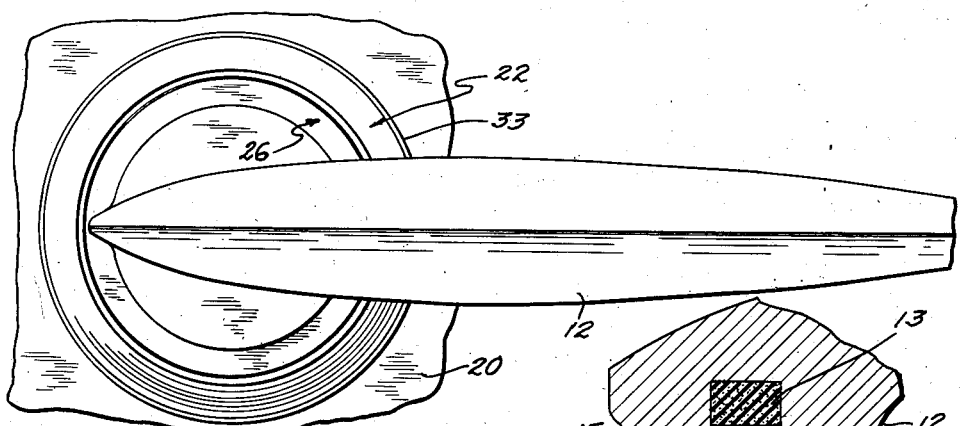
Fig. 1
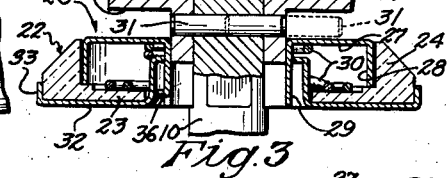
Fig. 3
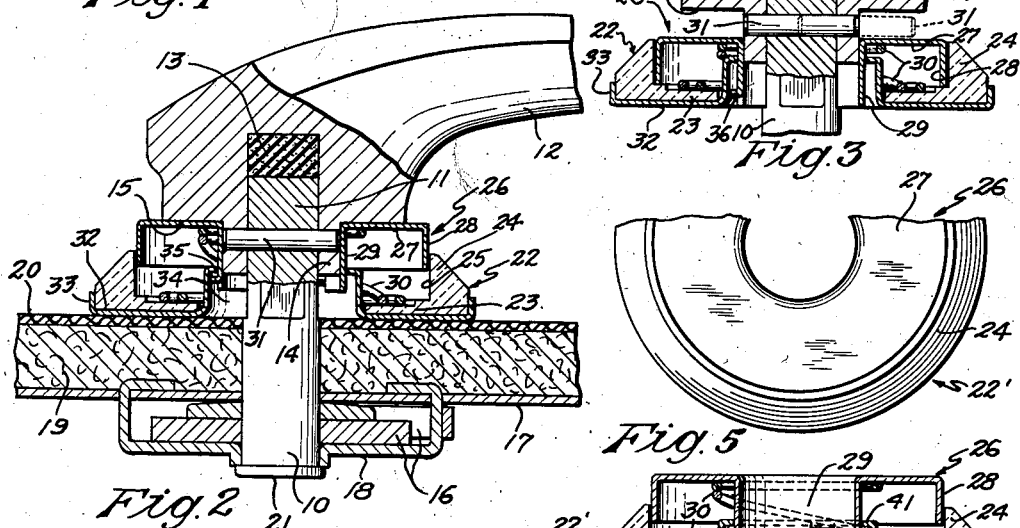
Fig. 2
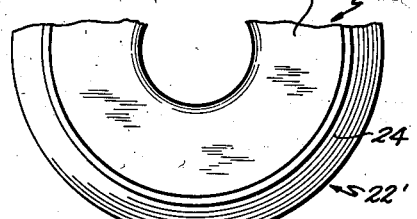
Fig. 5
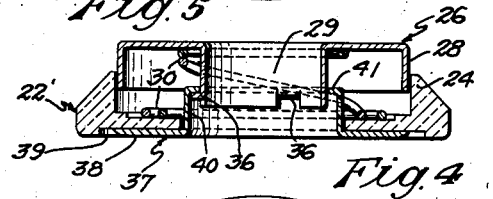
Fig. 4
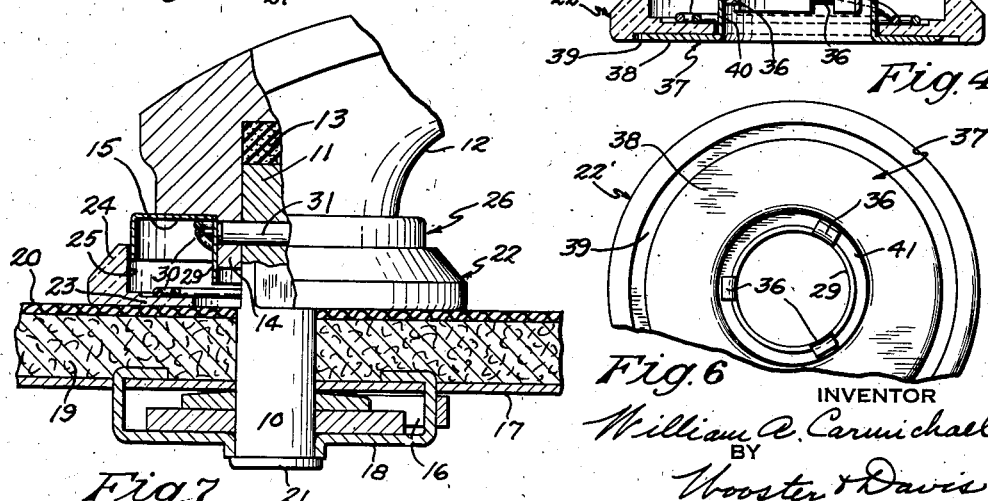
Fig. 7
Fig. 6
INVENTOR
William A. Carmichael
BY
Wooster & Davis
ATTORNEYS.

Patented Aug. 11, 1942

2,292,612

UNITED STATES PATENT OFFICE 2,292,612

INSIDE HANDLE ESCUTCHEON

William A. Carmichael, New Haven, Conn., assignor to C. Cowles and Company, New Haven, Conn., a corporation of Connecticut Application July 3, 1940, Serial No. 343,709

4 Claims. (Cl. 292—357)

This invention relates to an inside escutcheon for regulator or remote operating handles for automobiles for opening and closing windows, ventilator windows, door latches, and the like, and has for an object to provide an escutcheon construction including a base of molded plastic material so that it can be made of any color to match the finish of the car.

It is also an object to provide such an escutcheon which in spite of irregularities of trim will automatically align itself and allow even pressure on the handle and ease of operation.

It is a still further object to provide such an escutcheon which allows the use of a securing pin on the handle after the job is trimmed, and also having self-contained spring means giving a simpler and neater job about the handle mounting.

With the foregoing and other objects in view I have devised a construction as illustrated in the accompanying drawing forming a part of this specification. It is, however, to be understood that I am not limited to the specific construction shown but may employ various changes and modifications within the scope of the invention.

In this drawing:

Fig. 1 is a front elevation of an inside handle with my improved escutcheon applied;

Fig. 2 is a section thereof showing the parts in normal position;

Fig. 3 is a similar section with a portion of the handle and escutcheon showing the ferrule of the escutcheon shifted to permit insertion or removal of the securing pin for the handle;

Fig. 4 is a transverse section through an escutcheon of a slightly modified construction and removed from the handle;

Fig. 5 is a top plan view thereof;

Fig. 6 is a bottom plan view thereof; and

Fig. 7 is a section similar to Fig. 2 showing another slightly modified construction.

Most of the modern automobiles now use various plastics of different colors for inside trims, and this escutcheon has been developed in order to permit the use of similar plastic in the escutcheon to match the trim of the car. It also permits the use of the plastic trim as a part of the escutcheon, and further permits the installing of the handle with a securing pin through the shaft without having springs under the trim.

Referring first to Figs. 1 to 3, the handle and escutcheon is shown installed. This comprises a shaft or spindle 10 having a non-circular, as a square portion, 11 on which is an operating handle 12 provided with a similarly shaped opening or socket to receive the portion 11 of the shaft for operating it. There may be a sponge rubber or similar insert 13 at the bottom of the socket and pressing against the end of the shaft to tend to hold it against the securing pin and prevent loosening or rattling. The inner portion of the base of the handle is provided with a reduced portion 14 and a shoulder 15 at the outer end thereof. The shaft 10 is connected with a suitable operating mechanism indicated generally at 16 for operating any suitable device, not shown, such for example as a door latch, opening and closing window mechanism, ventilator operating mechanism, etc. and is mounted in the sheet metal panel 17 of the door, or door frame, or the lock board, by means of the bracket 18. On the inner side of the panel 17 ordinarily is placed padding 19 of any suitable fibre or other yielding material covered by a cloth or any suitable finish 20. This escutcheon, however, is not limited for use with a yieldable finish or trim, but may be used with a firm panel or finish. The shaft 10 may have an enlarged or flanged head 21, or any suitable means, to prevent its withdrawal from the panel or the operating mechanism.

The escutcheon is located about the shaft between the shoulder 15 and the finish 20. It comprises a base including a member 22 of molded plastic material of which there are a number of different kinds available on the market under various trade names which are usually molded under pressure while heated and harden on cooling, or they may harden under the action of heat and pressure, such for example as phenolic condensation products, casein derivatives, cellulose, etc. They are also available in a large number of different colors so that this member may be made to match the trim of the car. This member 22 comprises a bottom wall 23 from the outer side of which projects an outer flange 24, and is shown as having an inner cylindrical wall 25, although of course the escutcheon may be made of different shapes if desired. Telescoping within this flange is a ferrule 26 preferably formed from sheet metal having an outer wall 27 to engage the shoulder 15 and side walls 28 telescoping within the flange 24 of the base member. It also has an inner wall or sleeve portion 29 embracing the reduced portion 14 of the handle. Enclosed by the ferrule and base member 22 is a light coil spring 30 bearing at its upper end against the wall 27 of the ferrule and resting on the bottom wall 23 of the base member 22 of plastic. This spring tends to separate the ferrule and the base member to thus retain the ferrule against the shoulder 15 and the base member against the trim 20, but allows them to yield inwardly toward each other to allow for variations and irregularities. It also allows the ferrule 26 to be forced inwardly as shown in Fig. 3 to uncover the securing pin 31 passing through the reduced portion 14 of the handle and the shaft 10 to secure the handle to this shaft. As shown in Fig. 3 when the ferrule is in this position the pin may be inserted to secure the handle to the shaft, or it may be removed to permit removal of the handle from the shaft. After the pin has been placed in position the spring 30 shifts the ferrule 26 to the normal position of Fig. 2 causing the sleeve portion 29 of the ferrule to cover the ends of the pin and prevent any possibility of its accidentally dropping out to permit the handle to become loose or detached from the shaft.

The base rests directly on the finish 20 although it may be member 22 which contacts the finish 20 as shown in Fig. 7, or if desired the base may also include an auxiliary member 32 of sheet metal in which the member 22 is seated and member 32 may be formed with an outer flange 33 embracing the outer wall of the member 22. This flange 33 forms a trim ring on the base of the plastic 22. The member 32 may have an inner sleeve portion 34 extending through an opening in the bottom wall 23 of the base member and telescoping with the sleeve portion 29 of the ferrule 26, and it may be provided with an inwardly extending flange 35 on the outer end of the sleeve portion 34 to act as a stop for outwardly projecting stop lugs or ears 36 formed on the inner end of the sleeve portion 29 of the ferrule. Cooperation of these ears or lugs with the flange 35 limit outward movement of the ferrule 26 with respect to the base member 22 and prevent their separating during handling or transportation or in their application to the door, thus facilitating this operation. When applied to the handle, however, such limiting means is not necessary, as it will be evident from Fig. 7, as the spring 30 bears on the member 22 of plastic it holds this base member in place, and it also holds the ferrule in proper position.

In the form shown in Fig. 4 the metal auxiliary base member 37 corresponding to the member 32 of Figs. 2 and 3 does not have the outer flange 33, but merely has a flat bottom wall 38 seating in a recess 39 in the bottom wall of the base member 22' corresponding to the plastic base member 22 of the other figures. This auxiliary base member 37 has the inner sleeve portion 40 corresponding to the sleeve portion 34 of the member 32 and passing through an opening in the bottom wall of the base member 22'. This portion 40 has an internal flange 41 to cooperate with the lugs 36 on the ferrule 26 to limit separation of the ferrule and base member as described in connection with Figs. 2 and 3.

It is not necessary that there be a close fit between the telescoping portions 28 of the ferrule and the flange 24 of the base member, but, if desired, they may be relatively loose to give sufficient clearance to permit either member to rock relative to the other to allow for various irregularities. This base member of plastic material carries a corresponding trim to the escutcheon to permit carrying out of the color scheme throughout the trim of the car, and also makes a very substantial, simple, and effective escutcheon construction. This construction permits the use of plastic trim in the escutcheon, and yet permits the installing of the handle with a securing pin through the shaft without having to use springs under the trim. With irregularities in the trim this escutcheon automatically aligns itself and allows even pressure on the handle and ease of operation with a firm panel or finish. This escutcheon also allows the use of a securing pin on the handle after the job is trimmed, and with its self-contained spring means gives a much simpler and neater job around the handle mounting. Quite often in mounting handles with the old style conventional spring and escutcheon it was necessary to fuss around and sometimes use as many as four springs to push the trim up to the proper level, and then this causes too much friction against the handle and makes it hard to turn. These objections are obviated with the present construction. Further, with the spring bearing against the plastic material the device can be made with the parts relatively loose thus increasing the tolerances and insuring proper operation at all times.

Having thus set forth the nature of my invention, what I claim is:

1. In combination an escutcheon comprising a base including a member of molded plastic material having a bottom wall and a side flange projecting outwardly therefrom, a sheet metal ferrule having side walls telescoping in said flange, a spring resting on said bottom wall and engaging the ferrule tending to separate the ferrule and base, said base also including a sheet metal member extending under the plastic member and having a central sleeve portion extending through an opening in the bottom wall of said member, said ferrule having a sleeve portion telescoping with said first sleeve portion, and cooperating stop means on said sleeve portions to limit separating movement of the ferrule and base under action of the spring.

2. In an escutcheon, a base including a member of molded plastic material having a bottom wall provided with an opening therethrough and an outer flange extending upwardly therefrom, a sheet metal ferrule having a side wall telescoping within said flange and an inner sleeve portion connected with the side wall by a top wall, said base also including a sheet metal member having a portion under the bottom wall of the plastic member and a sleeve portion extending through the opening therein in telescoping arrangement with the sleeve portion on the ferrule, a spring between the ferrule and the base tending to separate them, and cooperating stop means on said telescoping sleeve portions to limit said separating movement.

3. In combination an escutcheon adapted to embrace the shaft between a door handle and the finish on the inner side of a door comprising a base including a member of molded plastic material having a bottom wall and an outer flange projecting outwardly therefrom having a cylindrical inner wall, a ferrule adapted to engage the handle and having a cylindrical side wall telescoping with the inner wall of the flange and extending beyond the outer edge of the flange, said side and inner walls being in substantially the same plane, and a spring between the base member and the ferrule tending to separate them to yieldingly retain the base and the ferrule against the finish and the handle respectively.

4. In an escutcheon, a base including a cupped member of molded plastic material having a bottom wall provided with an opening therethrough and an outer relatively thick flange extending laterally from said bottom wall having a cylindrical inner wall and an outwardly and backwardly inclined outer end wall, a ferrule having a cylindrical side wall telescoping with the inner wall of said flange and extending beyond the outer edge thereof, said side and inner walls being in substantially the same plane, and a spring between the ferrule and base tending to separate them and yieldable to permit the ferrule to be shifted into said member.

WILLIAM A. CARMICHAEL.